United States Patent [19]

Cherrick et al.

[11] Patent Number: 5,528,304

[45] Date of Patent: Jun. 18, 1996

[54] PICTURE-IN-PICTURE FEEDBACK FOR CHANNEL RELATED FEATURES

[75] Inventors: Sol M. Cherrick, Chicago; Kevin J. Gaughan, Arlington Heights, both of Ill.

[73] Assignee: Zenith Electronics Corp., Glenview, Ill.

[21] Appl. No.: 278,784

[22] Filed: Jul. 22, 1994

[51] Int. Cl.⁶ .............................. H04N 5/445; H04N 5/45
[52] U.S. Cl. ................................. 348/565; 348/563
[58] Field of Search ..................... 348/563, 564, 348/565, 566, 569, 570, 731, 732, 906; H04N 5/445, 5/45

[56] References Cited

U.S. PATENT DOCUMENTS

| | | | |
|---|---|---|---|
| 4,626,892 | 12/1986 | Nortrup et al. | 348/569 |
| 4,729,027 | 3/1988 | Hakamada et al. | 348/564 |
| 4,959,719 | 9/1990 | Strubbe et al. | 348/565 |
| 4,991,012 | 2/1991 | Yoshino | 358/183 |
| 5,212,553 | 5/1993 | Marouka | 348/563 |
| 5,398,074 | 3/1995 | Duffield et al. | 348/564 |
| 5,414,471 | 5/1995 | Saitoh et al. | 348/588 X |

FOREIGN PATENT DOCUMENTS

| | | | |
|---|---|---|---|
| 0376376 | 7/1990 | European Pat. Off. | H04N 5/45 |
| 0153177 | 7/1991 | Japan | H04N 5/45 |
| 4-113785 | 4/1992 | Japan | H04N 5/445 |
| 5-236372 | 9/1993 | Japan | H04N 5/445 |
| 5-300445 | 11/1993 | Japan | H04N 5/445 |

OTHER PUBLICATIONS

"Froxsystem Owner's Manual", Frox, Inc., 1993.

Primary Examiner—Victor R. Kostak
Assistant Examiner—John W. Miller
Attorney, Agent, or Firm—Roland W. Norris

[57] ABSTRACT

A television receiver has a main, or regular, display; a picture-in-picture display; and an on-screen menu display for adjusting various television operating parameters, including those which are channel or source related, such as channel labeling, source labeling and on-screen program guide operation. When a channel or source related menu is displayed for operation on channel or source related functions, the channel or source operated upon is displayed in the picture-in-picture display and the main display may be blanked to present a more legible background for the menu.

7 Claims, 4 Drawing Sheets

PICTURE-IN-PICTURE FEEDBACK FOR CHANNEL RELATED FEATURES

BACKGROUND OF THE INVENTION

1. Field of the Invention

This invention relates to television receivers and their control. The invention is addressed specifically to an enhancement of the utility of on-screen menus which can be improved with the addition of a P-I-P (picture-in-picture) display therewith.

2. Discussion of the Related Art

In P-I-P displays, as known in the art, a small portion of the television-screen is blanked and a picture is superimposed over the blanked area. The P-I-P displays of the prior art generally receive their video signal from a tuner other than the main tuner of the television receiver which produces the main, or large display. The term P-I-P as used throughout is also meant to encompass "picture out of picture" (P-O-P) displays.

In many instances current television receiver operating parameters are set up for operation through the use of on-screen displays, or menus. For present purposes an on-screen display will be considered as a displayed television receiver operating parameter menu through which operation on a source-related or channel-related function is accomplished. The operating parameters that act on or switch between channels or input signal sources of the TV shall be referred to herein as source-related or channel-related functions. Such parameters may include: channel addition/deletion, channel labeling, and source labeling, as further explained below, or "parental control" channel blocking or the like. Other instances of menu operation for the TV may include the recently emerging "on-screen program guides" such as "STARSIGHT" (TM) which provide for control of channel selection and/or recording from a daily program grid, such as seen in FIG. 7.

Channel addition/deletion provides for the addition to, or deletion from, the list of selectable channels by means of an operator interface such as a remote control unit (RCU). By way of example, the user calls up on the television-screen a table of all the possible television channel numbers, for example in VHF and UHF, from 2 to 83. The table is scanned using adjustment keys on the RCU. By highlighting the channel number and depressing a selected switch on the RCU, the user can delete an undesired channel from the list of selectable channels. The deleted channel may be, for example, one that has a weak broadcast signal in the area, or it may be the channel for a station featuring a foreign language not understood by the viewer. The reduction of the number of selectable channels from a possible 82 to perhaps only 10 channels, for example, facilitates channel selection by means of channel up/down control as only the desired channels are then tuned in. If a channel becomes desired later, it can be added to the list of desired channels by the same process.

"Channel labeling" is a function which allows the television to display an indication of the source of the programming, for example, the sources shown in FIG. 5, along with, or instead of, the channel number.

"Source identification" is a function which allows the television to display an indication of the source of the video signal input to the video display circuitry, for example, the source identifiers listed in FIG. 6, along with, or instead of, the input jack designation through which the signal source is input to the television.

The convenience of the above-cited features may be vitiated by the fact that the viewer, after selecting a menu from which the channels or signal sources may be operated upon, may have to use the RCU to call up the television picture to ascertain the nature of that particular channel or source, after which the viewer must again revert to the menu function in order to operate upon the channel or signal source parameters. Further, the known menus of these channel or source related functions are sometimes troublesome because they are overlaid on an active channel, or main screen, display which is the regular television display intended to fill the whole television screen. The menu may thereby obscure portions of the main screen display. The main screen display also could provide a background which makes the menus hard to see, especially where the active channel signal is weak or blank, thereby causing an unstable picture.

It is, therefore, an object of the invention to enhance the utility of such menu driven channel or source related functions through use of the P-I-P display in a television receiver. It is another object of the invention to facilitate the addition or deletion of selectable broadcast channels from the television receiver, the labeling of channels, the identification of the source of the signals delivered to the television receiver, and the use of on-screen programming guides, all through the use of the P-I-P display.

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

DESCRIPTION OF THE PREFERRED EMBODIMENT

Figure 1:
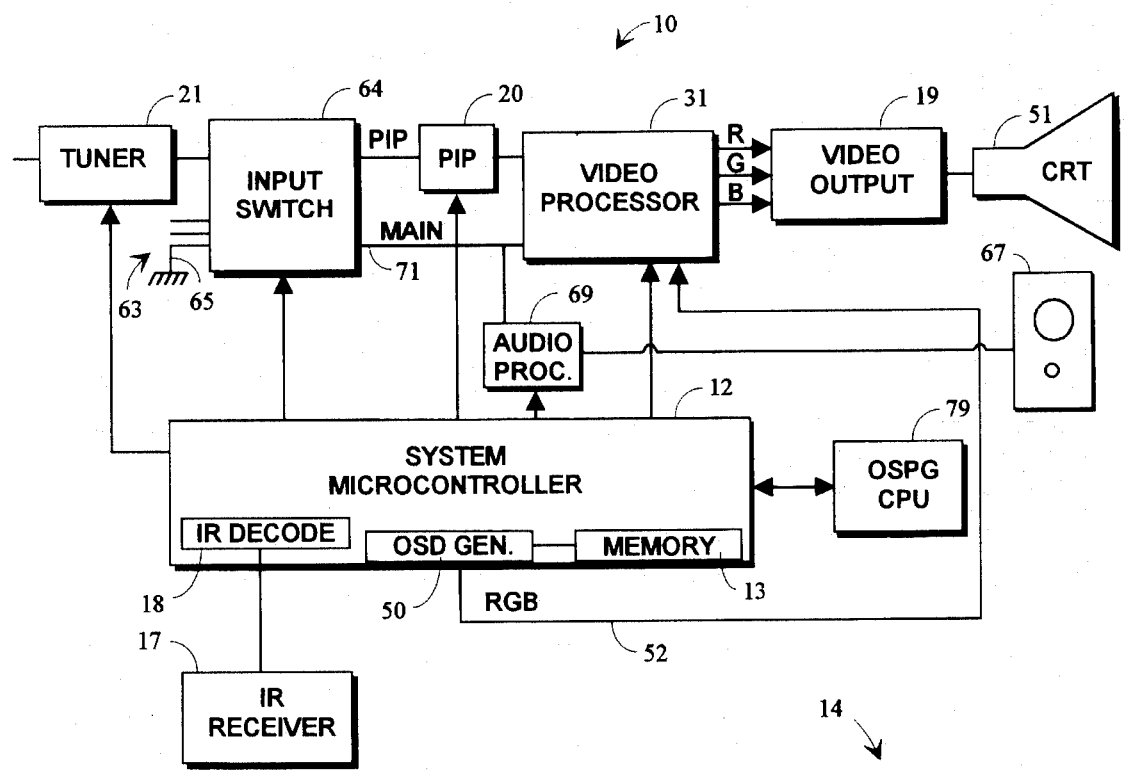
FIG. 1 is a simplified block diagram of a color television display system according to the present invention.
Figure 2:
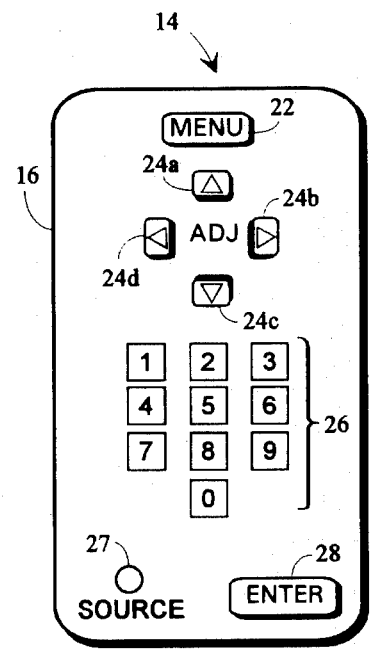
FIG. 2 is a simplified depiction of a remote control unit (RCU) used in conjunction with the present invention.

Referring now to FIGS. 1 and 2, there is shown a simplified block diagram of a color television receiver 10 that includes the circuitry for activating and controlling the real time P-I-P display according to the invention. FIG. 1 as depicted and described covers only the components of interest to the present invention, and excludes details of signal processing and other circuits well known in the art.

Within the television receiver 10, there is a microprocessor 12, sometimes termed a "systems controller" or "microcontroller" as these terms define its essential function. Within, or connected to, the microprocessor 12 is a memory module 13, infared (IR) decoder 18, and an on-screen display (OSD) generator 50.

The operation of the microprocessor 12, in terms of operator input, is controlled by means of a user-operated alphanumeric keyboard 14 located on the RCU 16 in a known fashion. The commands entered on the keyboard 14 are transmitted to an IR receiver 17 and decoder 18 in the television receiver 10 by way of an infared signal as known in the art.

In controlling the operation of the television receiver 10, the microprocessor 12 interprets and processes the user commands entered from the RCU 16, and issues commands to the components of the television receiver 10; e.g., tuning, volume, channel selection, etc., in general, and specifically in controlling the functions according to the invention.

A video processor 31 in the television receiver 10 receives and processes the television signal and sends it to video output circuitry 19 which in turn drives a CRT 51. The video processor 31 may contain the P-I-P circuitry 20 and is under the control of the microprocessor 12 which in turn controls circuits such as the on-screen display generator 50 contained therein and the input switching circuit 64 which helps to affect the present invention as further explained below.

Operating controls of the RCU 16 are indicated in the FIG. 2 depiction of the keyboard 14, which include the menu key 22, the arrow keys 24a–24d, the numeral keys 0–9 of the number pad 26, indicated by the bracket, a source key 27 and an enter key 28. The arrow keys 24a–24d are arranged in four directions, i.e., up, down, left, and right, 24a, 24c, 24d, 24b, respectively, and provide for operations such as scanning a cursor over a menu, as described below. Additionally, the left and right arrows 24d, 24b are dedicated to specific adjustments, as will be described.

It is to be noted that the use of the invention is not limited to these particular control designations, as any of the many controls typically on an RCU keyboard could as well be programmed to control the inventive functions, as would be understood by the artisan of ordinary skill.

Figure 3:
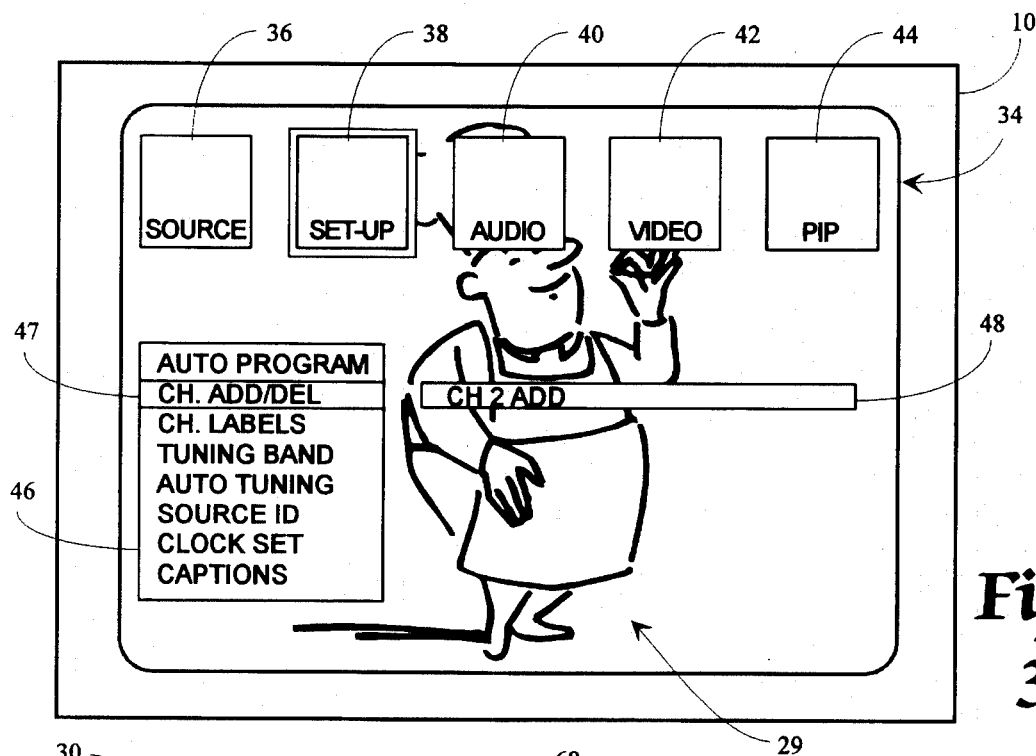
FIG. 3 is a television picture depicting five icons, each of which represents a category for television parameter adjustments, and an adjacent list of "set-up" menus for television receiver operation.

Referring also to FIG. 3, access to the menus for selecting the signal source, setting up the receiver 10, and adjusting other television parameters is gained by depressing the menu key 22 on the RCU 16. The normal television picture, or main screen display, 29 is then overlaid with a banner of adjustment icons 34 across the top of the screen. The icons 34 are identified from left to right as follows: source icon 36, set-up icon 38, audio icon 40, video icon 42, and P-I-P icon 44. An icon 34 is selected by sequentially depressing the menu key 22 which, operating in a "wrap-around" mode, successively scans or highlights the icons 34 indicating selection. A pull down list of menus 46 appears when the icon is selected. In FIG. 3 the set-up icon 38 is indicated by a double border as having been highlighted or selected.

The sequence of television operation illustrative of the present invention is as follows: the menu key 22 is pressed and the icons 34 appear, superimposed on the television picture 29. The set-up icon 38 is selected by scanning the icons 34 with the menu key 22. Upon selection of the icon, the list of menus 46 appears, also overlaying the normal television picture 29. The menu list 46 provides for selection of the set-up procedures listed, that is, AUTO PROGRAM et al. The identity of the channel to which the television receiver is presently tuned, e.g.,channel two, is indicated by the channel indicator overlay 48.

The icons 34, and the overlays 46 and 48, are generated by the on-screen display, or character, generator 50 upon command from the microprocessor 12, which in turn has responded to the menu command from the RCU 16. The overlays are in color as indicated schematically by the RGB control line 52.

With reference to the menu list 46, the three operations relevant to the preferred embodiment are CH. ADD/DEL (adding or deleting a channel), CH LABELS (labeling a channel) and SOURCE ID (identifying the source of the signal routed to the video display electronics of the television, whether from an antenna, a VCR, laser disc player, or other).

Figure 4:
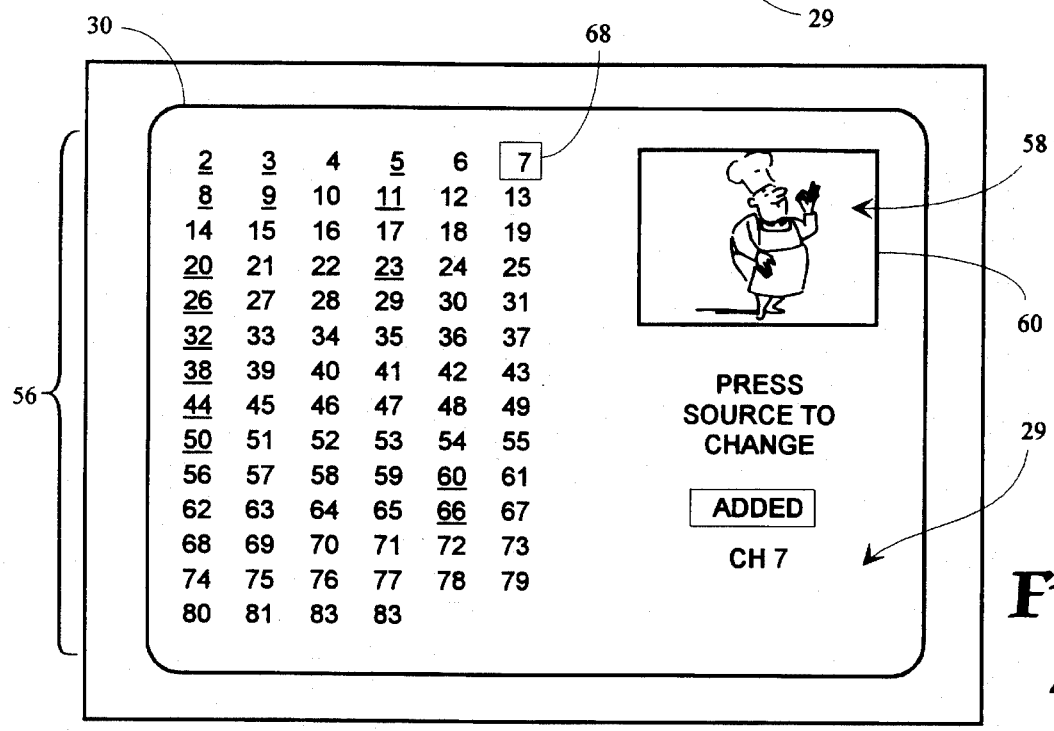
FIG. 4 shows an on-screen menu display of broadcast channels, used in adding or deleting an active channel; with a real time P-I-P display according to the invention shown in a corner of the screen.

To add or delete a channel, the user will scan the menu list 46 to the CH. ADD/DEL option. The selection is indicated by a banner 47 which is scrolled up or down to highlight the options. This is done by pressing the up/down arrow keys 24a, 24c. The user then presses the right or left arrow key 24b, 24d and a channel add/delete menu 56 (FIG. 4) comprising a table of channels is called up from memory module 13 and compiled by the on-screen display generator 50 for display on the CRT 51, as depicted in FIG. 4. The channel which is presently selected by the tuner 21 for the main picture is then applied to the P-I-P circuitry 20 by control of the input switch 64. The P-I-P window 60 then displays the picture 58 of the broadcast channel to which the television receiver 10 is presently tuned.

The main screen display 29 on the television receiver screen 30 is blanked. This can be done by switching the signal source going to the main screen with input switch 64 to a nonexistent signal source or ground 65 to create a blank screen or such other way as is convenient. In this way, the sound from the television speaker 67 is also blanked since the audio processor 69 receives its signal from the main display line 71 also. Alternatively, or in addition, the speaker output may be muted in the audio processor 69 under the control of the microprocessor 12. The menu presents the channels that are presently active, i.e., selectable for viewing, as highlighted by an overlay of color, a condition indicated schematically by the underscoring of the respective active channel numbers. Nonactive channels are displayed in white.

In the process of adding or deleting a channel, the user scans the channel menu 56 with a cursor 68 which outlines and delineates the specific number of the channel to be changed, in this case channel 7. The scanning of the cursor 68 is accomplished by depressing the appropriate one of the four arrow keys 24a–24d on the RCU 16.

As the channel add/delete menu 56 is scanned, the tuner 21 is adjusted therewith such that the real-time picture of the channel identified by the cursor 68 appears in the P-I-P window 60. If there is no signal on the channel identified by the cursor 68, the user will know it from the fact that there will be no picture in the P-I-P window 60. The user can then delete the channel by depressing the SOURCE KEY 27. The SOURCE KEY 27 acts as a toggle to also add channels to the active list.

One benefit of a real-time P-I-P display according to the invention derives from the fact there is no need to switch back and forth between the channel add/delete menu 56, and the television display of the channels. Further, the channel add/delete menu 56 is overlaid onto a blank screen rather than an active picture in order to improve legibility of the menu while retaining full picture viewing capability.

In certain instances it may be desirable to label a tuner channel number with the programming source found at that tuned frequency. For example, where cable TV and terrestrial broadcast TV channel designations do not match, the operator may wish to label the cable channels with the source as further explained below.

Figure 5:
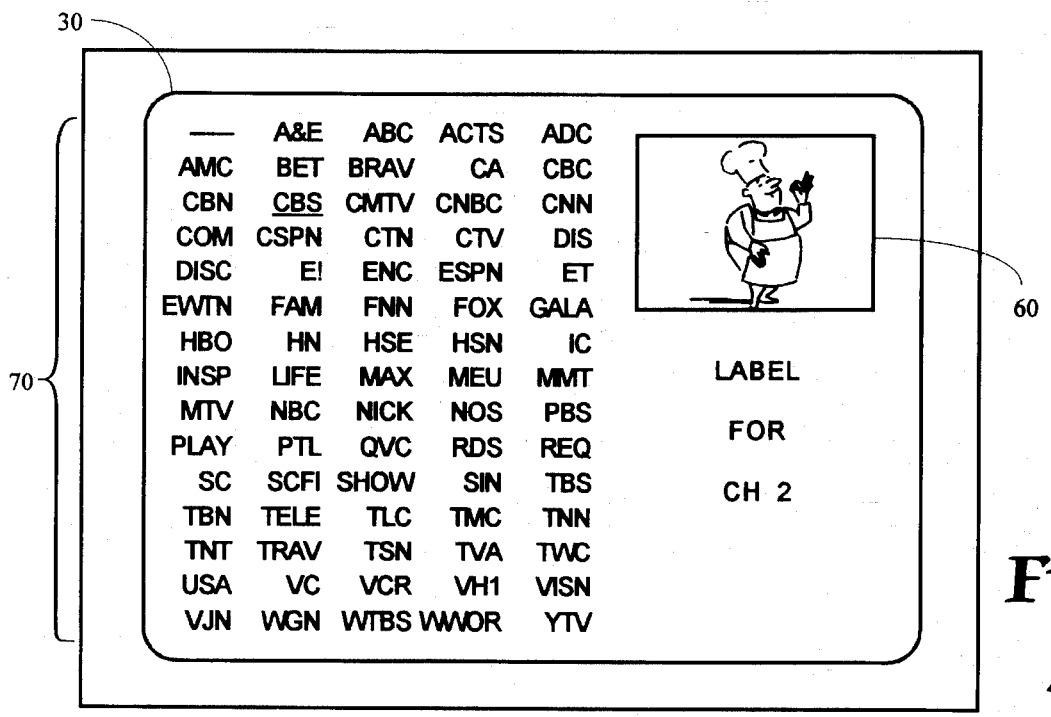
FIG. 5 is an on-screen menu display of channel labels which the user can apply to designated ones of the channel numbers selected from the on-screen display of FIG. 4; with a real time P-I-P display according to the invention shown in the corner of the screens.

To label a channel, starting from the menu list 46 of FIG. 3, the banner 47 is scanned to CH. LABELS by depressing the down arrow key 24c. The left or right arrow key 24b, 24d is then depressed. The menu depicted in FIG. 5 is called up from the memory module 13 as per above, and a list of labels 70 from which to make a selection is shown. The tuner 21 is also routed to the P-I-P circuitry and the main screen 32 is blanked as per above. If a channel, denominated X, is a CBS channel and is to be so labeled, the television tuner 21 is set to channel X, as indicated, and the active television picture of channel X appears in the P-I-P window 60. The user scans the labels menu 70 to highlight CBS, indicated schematically by the underscore, using the arrow keys 24a–24d of the RCU 16. The channel label may be automatically established when the operator moves to the next channel number for additional channel labeling by depressing the menu key, or waiting ten seconds. Thereafter, whenever channel X appears in the channel indicator overlay 48 or during a regular television display, it will read "CH X CBS". The menu screen 32 is restored when depressing the menu key 22, or waiting the time-out of ten seconds, after which the main screen display will appear.

Figure 6:
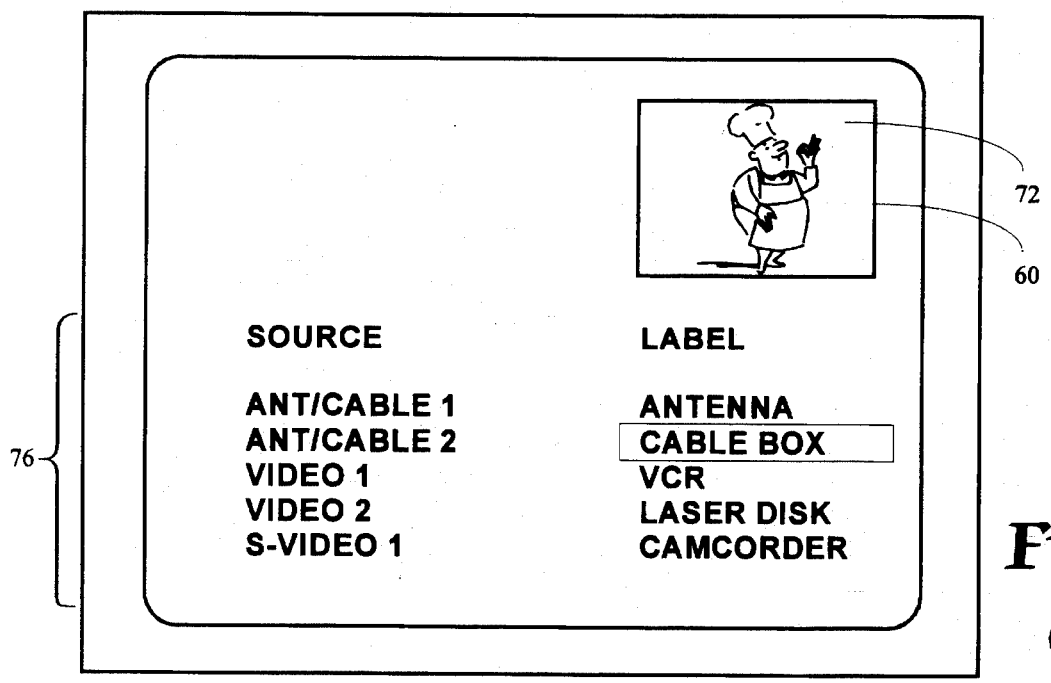
FIG. 6 shows the menu used in labeling the signal sources, along with a depiction of an associated real time P-I-P display according to the invention.

The television receiver 10 of the present invention may have multiple signal sources 63 selectably routed to the video processor 31 through the source selection switch 64. A list of sources in this example are shown in FIG. 6 as comprising ANT/CABLE 1, ANT/CABLE 2, VIDEO 1, VIDEO 2, and S-VIDEO 1. These designations actually denominate the jack into which the signal source is fed to the TV. Accordingly, the operator may wish to label the actual source of the signal such as antenna, cable, satellite, VCR, etc. in place of the jack designations making the operation of the TV when switching between sources more intuitive. The "source ID" function is accessed through the set-up menu list 46 as shown in FIG. 3 to obtain the function screen shown in FIG. 6. The main screen is blanked as per above and input switch 64 feeds the selected source to P-I-P circuitry 20. Referring to FIG. 6, as the sources 76 listed on the source ID menu are scanned by means of four down arrow keys 24a, 24c on the RCU 16, a real-time P-I-P display 72 of the source signal appears in the P-I-P window 60 with the input switch 64 changing the signal source to the P-I-P circuitry 20. If there is no signal input to the jack identified, the P-I-P window 60 will be blank.

The signal sources can then be labeled by means of the right and left arrows 24b, 24d. The labeling of the source of ANT/CABLE 2 shown in FIG. 5, is accomplished by depressing the left or right arrow key to call up the signal source labels, which appear sequentially in "wrap-around" in the highlighted LABEL banner 73. The labels may comprise antenna, cable box, VCR, laser disc, camcorder, satellite, etc. When the the desired source label appears, the left or right arrow is released, and the label is assigned.

Figure 7:
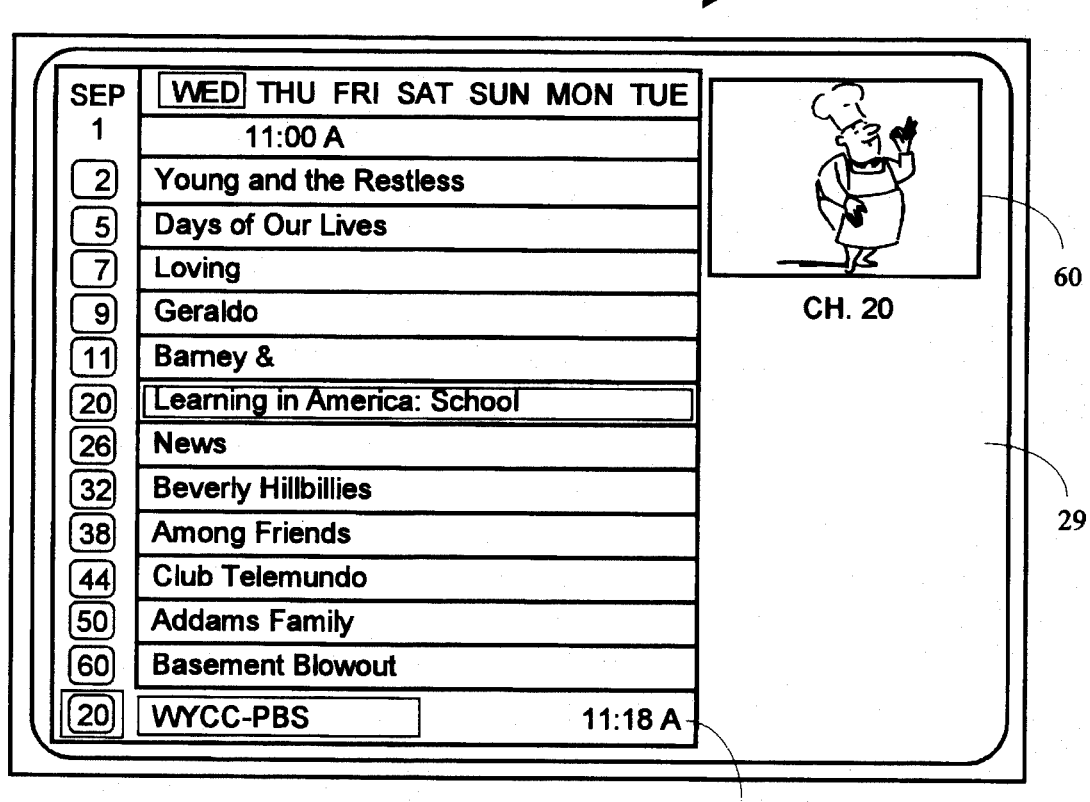
FIG. 7 shows an on-screen programming guide with a real-time P-I-P display according to the present invention.

As seen in FIG. 7, an on-screen program guide (OSPG) menu 77 lists a segment of a current television program listing in a typical graphic format. The OSPG is controlled through a separate microprocessor 79 (FIG. 1) as known in the art. The operator can cursor through the program listing to highlight a certain program, in this case that of channel twenty, in order to learn more about the program, select it for recording, etc. In order to enhance the utility of the OSPG menu 77 according to the present invention, when the operator has selected a program listing that corresponds to the present time 81, the tuner 21 will be switched to the channel highlighted and that signal will be fed to the P-I-P circuitry 20 through control of the input switch 64 in order that the operator will be able to see the present programming in the P-I-P window 60 to further enhance his selection criteria. The main screen display is preferably blanked although this is not as important to operator ergonomics in the present situation as in those previously cited because the program listing 77 is a solid field occupying most of the screen While the present invention has been illustrated in connection with the preferred embodiment, it is not to be limited to the particular structure shown because many variations thereof will be evident to one skilled in the art and are intended to be encompassed in the present invention as set forth in the following claims.

Having thus described the invention, what is claimed is:

1. A television receiver having:

A) a picture-in-picture (PIP) display;

B) a main display;

C) an on-screen display for the selection of channel-related functions;

D) means for displaying the on-screen display with a channel table of channel choices and with a cursor manipulatable to select different channels from the channel table; and E) means for automatically changing a signal routed to the P-I-P display when the cursor of the on-screen display is manipulated to a different channel to thereby display the different channel in the P-I-P display concurrently with said channel table.

2. A television receiver comprising:

A) means for generating a main display from a main display signal;

B) P-I-P means for generating a picture-in-picture display;

C) means for generating an on-screen menu display with a table of channel choices for the selection of channel-related functions;

D) means for selecting channels on which the channel-related functions operate,

E) first switch means for blanking the main display when said on-screen menu displays are generated;

F) second switch means for routing the main display signal to the P-I-P means such that the main display signal is generated in the Picture-In-Picture display; and G) means for changing the signal input to the P-I-P means in correspondence with a changed selection of channels by the means for selecting, whereby as a channel is selected from the channel table, the selected channel is displayed in the Picture-In-Picture display concurrently with the display of the channel table.

3. A television receiver having:

A) a main display circuit,

B) an on-screen menu display circuit,

C) a picture-in-picture (P-I-P) display circuit;

D) the on-screen menu display circuit having a table of channel choices and a cursor manipulatable to select a channel from said table for channel-related functions;

E) switch means for transferring a main display signal to the P-I-P display circuit;

F) a tuner for receiving broadcast signals and selecting the main display signal from said broadcast signals; and G) tuner control means for changing the broadcast signal selected;

H) means for routing the main display signal from the main display circuit to the P-I-P display circuit in response to a displaying of the on-screen menu display, I) means for displaying the main display signal in a P-I-P display concurrent with the on-screen menu display, and J) means for operating the tuner control means to change the main display signal routed to the P-I-P display circuit to accord with the main display signal selected by the manipulatable cursor.

4. The television receiver according to claim 3 further comprising means for blanking the main screen display when said main display signal is routed from the main display circuit to the P-I-P display circuit.

5. The television receiver according to claim 4 wherein the means for blanking further includes an input switch, the input switch capable of connecting the main display circuit to a nonexistent or grounded signal source.

6. The television receiver according to claim 3 wherein the means for changing the channel signal further includes a system controller microprocessor in the television receiver which controls the tuner and the on-screen menu display.

7. The television receiver of claim 3 further comprising means for blanking the audio output of the receiver when the main display signal is routed from tile main display circuit to the P-I-P display circuit.

* * * * *

UNITED STATES PATENT AND TRADEMARK OFFICE
CERTIFICATE OF CORRECTION

PATENT NO. : 5,528,304

DATED : Jun. 18, 1996

INVENTOR(S) : Sol. M. Cherrick, et al

It is certified that error appears in the above-identified patent and that said Letters Patent is hereby corrected as shown below:

Col. 8, line 15, cancel "tile" and substitute --the--

Signed and Sealed this

Third Day of September, 1996

Attest:

BRUCE LEHMAN

*Attesting Officer*    Commissioner of Patents and Trademarks